United States Patent
Zank et al.

(10) Patent No.: US 6,307,955 B1
(45) Date of Patent: Oct. 23, 2001

(54) ELECTRONIC SIGNATURE MANAGEMENT SYSTEM

(75) Inventors: Anthony E. Zank; David R. Stevens, both of Simi Valley, CA (US)

(73) Assignee: Topaz Systems, Inc., Simi Valley, CA (US)

(*) Notice: Subject to any disclaimer, the term of this patent is extended or adjusted under 35 U.S.C. 154(b) by 0 days.

(21) Appl. No.: 09/216,246

(22) Filed: Dec. 18, 1998

(51) Int. Cl.[7] ............................. G06K 9/00; G06K 9/68; H04L 9/00; H04K 1/00
(52) U.S. Cl. ..................... 382/121; 382/122; 382/189; 382/218; 713/176; 380/30
(58) Field of Search ................................. 382/187, 188, 382/189, 200, 201, 218, 219, 116, 119, 120, 121, 122, 123; 713/170, 176, 187; 380/30, 282

(56) References Cited

U.S. PATENT DOCUMENTS

| | | | |
|---|---|---|---|
| 4,240,065 | * 12/1980 | Howbrook | 382/315 |
| 4,941,176 | * 7/1990 | Matyas et al. | 380/280 |
| 5,111,512 | 5/1992 | Fan et al. | 382/122 |
| 5,226,091 | 7/1993 | Howell et al. | 382/107 |
| 5,280,527 | 1/1994 | Gullman et al. | 713/184 |
| 5,285,506 | 2/1994 | Crooks et al. | 382/189 |
| 5,297,202 | 3/1994 | Kapp et al. | 705/75 |
| 5,544,255 | 8/1996 | Smithies et al. | 382/119 |
| 5,698,822 | * 12/1997 | Haneda et al. | 178/18.01 |
| 5,799,086 | * 8/1998 | Sudia | 705/76 |
| 5,850,451 | * 12/1998 | Sudia | 380/286 |
| 5,872,848 | 2/1999 | Romney et al. | 713/176 |
| 5,892,824 | * 4/1999 | Beatson et al. | 713/186 |
| 5,909,500 | * 6/1999 | Moore | 382/123 |
| 5,936,149 | * 8/1999 | Fischer | 73/1.43 |
| 5,995,084 | * 11/1999 | Chan et al. | 345/173 |
| 6,021,202 | * 2/2000 | Anderson et al. | 705/54 |

* cited by examiner

Primary Examiner—Amelia M. Au
Assistant Examiner—Mehrdad Dastouri
(74) Attorney, Agent, or Firm—Sheldon & Mak

(57) ABSTRACT

An electronic signature management system includes a graphic tablet digitizer for signaling position coordinates of a stylus being moved to produce a handwritten signature, a clock circuit of the digitizer defining a fixed interval between successive stylus position measurements, a computer processor electrically interfaced with the tablet and programmed for receiving and storing a multiplicity of the coordinates in sequential order as an electronic signature forming a time history of the stylus movement. The computer is also programmed for verifying the fixed time intervals of the measurements, such as by comparing a ratio of total elapsed time and total number of the measurements with a standard measurement interval, and for comparing the electronic signature with a reference signature, such as by feeding a stored reference signature counterpart and the electronic signature into a cross-correlator for evaluating a degree of correspondence between respective time histories of the electronic signature and the reference signature. The signatures can also be compared visually in a simultaneous display wherein respective pointers follow the signatures orthogonally in response to an operator-controlled slider, with pertinent data corresponding to the pointer positions being displayed. The electronic signature is preferably encrypted using a hash function or message digest of the document as a key. Also disclosed are methods for electronically signing a document, wherein the electronic signature is electronically bound to the document, wherein the electronic signature is encrypted using a key derived from the document and not saved, and methods for decrypting and verifying electronic signatures.

33 Claims, 3 Drawing Sheets

ELECTRONIC SIGNATURE MANAGEMENT SYSTEM

BACKGROUND

The present invention relates to document authentication, and more particularly to the utilization of handwritten signatures in connection with electronically stored, transmitted, and retrieved data and documents.

Handwritten pen-on-paper signatures have been the basis of contracts in commerce for hundreds of years, for a variety of reasons, including:

1. The signature and documents are one in the same, being forever bound together by the ink being on the paper;
2. The identity of the signer can be verified after the fact by a trained forensic document examiner who is skilled in the art and science of signature character analysis, and who can testify, be qualified, and be cross-examined in a court of law; and
3. The signer can keep a copy or duplicate original of the contract to deter fraud.

In the continuing development of electronic document storage and retrieval, a recognized need is inclusion of legally effective signatures for creating legally binding electronic records. Early systems addressing this need utilized a simple image of a signature (such as a bit map) being affixed to a document as a picture of a signature. This approach had the disadvantage that the bit map image of the signature is difficult to verify as being directly from the hand of the signer, in that little if any dynamic data is present. Also, an image of a signature can easily be scanned from an existing document or record and improperly inserted into a document as a forgery.

Later systems included computer algorithms for verifying a signature prior to the user being able to sign an electronic document. Problems with this method include the need to enrol the signer into an electronic verification unit of the system prior to use, the potential for errors in the verification algorithm, and the inability to demonstrate the accuracy of verification of a signature to a layperson or in a court of law. Further, the signatures are typically not transportable to systems having different algorithms without loss of data precision.

U.S. Pat. No. 5,544,255 to Smithies et al. Discloses a computer-based system for capturing and verifying a handwritten signature of an electronically stored document by capturing the signature and storing a set of statistical measurements in a signature envelope that can contain a checksum of the document. The measurements can include shape, number of pen strokes, total line length, average stroke length, number of acceleration and deceleration maxima events, the overall time taken to complete the signature, and the pen down time. The system can also contain a database of known signature measurement templates to be compared with a submitted signature to produce a similarity score. The system if Smithies at al. is not entirely satisfactory; for example:

1. The signature envelopes cannot be verified by a forensic document examiner using traditional methods;
2. The signature envelopes are not readily transportable to future systems, being based on arbitrary measurement statistics of the handwritten signatures; and
3. The signature envelopes are ineffective to the extent that they omit information originally contained in the handwritten signature itself.

Thus there is a need for an electronic document signature system that is effective, reliable, easily verifiable, resistant to forgery, and easy to use, and that otherwise overcomes the disadvantages of the prior art.

SUMMARY

The present invention meets this need by providing a system for the electronic capture of signatures, the binding of the signature to a document or data, and means for compression and storage of the signatures. The invention further provides means for authentication after the fact of the signature by a trained forensic document examiner. Thus the system combines the effectiveness of time-proven pen-on-paper methods of commerce with the efficiency of automatic computer operations. The system also allows for the signer to keep a receipt of both the document and the signature as a duplicate original representation.

In one aspect of the invention, the system includes a graphic tablet for signaling position coordinates of a stylus during manual movement thereof relative to a writing surface; a clock circuit for periodically initiating position measurements by the graphic tablet at predetermined fixed time intervals; a first computer processor electrically interfaced with the tablet, the processor being programmed for receiving a multiplicity of the coordinates during the manual movement of the stylus, and storing respective sets of the coordinates in sequential order as an electronic signature while preserving a time relation between coordinates, the electronic signature forming a time history of the stylus movement; and means for verifying the fixed time intervals of the measurements. The system can further include means for comparing the electronic signature with a reference signature, such as by including reference memory for storing an electronic counterpart of the reference signature, and a cross-correlator for evaluating a degree of correspondence between respective time histories of the electronic signature and the electronic counterpart of the reference signature. The reference memory can be electronically interfaced with the first computer processor. Also, or in the alternative, the means for comparing can be implemented as a parallel display of the electronic and reference signatures, each having a cursor positioned along and perpendicular to a line segment thereof and being movable along the signature ion response to operator input.

The electronic signature can have associated therewith a date and time of the handwritten signature. The electronic signature can have further associated therewith an annotation including at least one of a geographic location, a physical address, and an identification string. The first computer processor can be a digital processor, the electronic signature being a digital signature.

The graphic tablet can include the clock circuit. Preferably the time intervals are not greater than 20 milliseconds. More preferably, the time intervals are between 2 milliseconds and 3 milliseconds. The means for verifying the time intervals can include the computer being programmed for determining a ratio of a total elapsed time of the measurements and a total number of the measurements, and comparing the ratio with the predetermined interval. Alternatively, the clock circuit has a certified unalterable time interval, the tablet being implemented for transmitting an encoded certification stamp with the coordinate data, and the computer can be programmed for decoding the certification stamp to verify use of the certified time interval.

The computer can be further programmed for encrypting the time history to a fixed key of arbitrary length, the stored electronic signature being in encrypted form. Preferably the computer is programmed for generating the key as a cryptographic hash function or message digest of the document. Hereafter, the term "cryptographic hash function" is used interchangeably with "message digest" notwithstanding technical differences therebetween.

In another aspect of the invention, a method for electronically signing a document includes the steps of:
 (a) progressively capturing a handwritten signature as an ordered sequence of data corresponding to successive coordinates and corresponding timing of stylus movement producing the signature;
 (b) storing the data as an electronic signature; and
 (c) electronically binding the electronic signature to a stored counterpart of the document.

The step of binding can include the further steps of:
 (a) creating an encryption key by generating a cryptographic hash function of the stored counterpart of the document; and
 (b) encrypting the electronic signature to the encryption key.

The method can include the further steps of identifying stored instances of the encryption key and erasing each such instance.

In a further aspect of the invention, a method for electronically signing a document includes the steps of:
 (a) capturing a handwritten signature as a sequence of data corresponding to coordinates of stylus movement producing the signature;
 (b) storing the data as an electronic signature;
 (c) creating an encryption key by generating a cryptographic hash function of a stored counterpart of the document;
 (d) encrypting the electronic signature to the encryption key, thereby electronically binding the electronic signature to a stored counterpart of the document;
 (e) identifying stored instances of the encryption key; and
 (f) erasing each stored instance of the encryption key.

The step of storing can include the further steps of:
 (a) encrypting the sequence of data to a fixed key of arbitrary length; and
 (b) storing the encrypted sequence as the electronic signature.

The step of storing can include the further steps of:
 (a) determining a date and time at which the handwritten signature was produced; and
 (b) including counterparts of the date and time with the electronic signature.

The step of storing can include the further steps of:
 (a) determining a set of document data associated with the document;
 (b) generating a cryptographic hash data string of arbitrary length from the document data; and
 (c) encrypting the electronic signature using the cryptographic hash data string.

The method can include the further step of electronically tying the encrypted signature to the stored counterpart of the document using a device selected from the set consisting of forming a linked directory structure, forming a database, forming a compressed file, and forming a common digital signature packet.

In still a further aspect of the invention, a method for decrypting a signature having been encrypted by the above method to facilitate authentication of the binding includes the further steps of:
 (a) creating a counterpart of the encryption key by generating another cryptographic hash function of the stored counterpart of the document;
 (b) decrypting the electronic signature using the encryption key, thereby electronically binding the electronic signature to a stored counterpart of the document;
 (c) identifying stored instances of the encryption key; and
 (d) erasing each stored instance of the encryption key.

In yet another aspect of the invention, a method for electronically signing a document includes the steps of:
 (a) capturing a handwritten signature as a sequence of data corresponding to coordinates of stylus movement producing the signature;
 (b) storing the data as an electronic signature;
 (c) creating a signature receipt as a cryptographic hash function of the electronic signature;
 (d) creating a document receipt as a cryptographic hash function of a stored counterpart of the document; and
 (e) producing counterparts of the signature and document receipts.

Preferably the method includes the additional steps of:
 (e) embedding the signature receipt into the document; and
 (f) embedding the document receipt into the electronic signature, thereby to form a cross-linked binding of the signature with the document.

The method can include the further steps of:
 (a) providing a transportable file medium;
 (b) copying counterparts of the document receipt and the signature receipt on the file medium; and
 (c) delivering the file medium having the receipt counterparts to a signer of the document.

In yet another aspect of the invention, a method for verifying the signature of an electronically signed a document having associated therewith an electronic signature being a stored sequence of data corresponding to coordinates of stylus movement producing a first handwritten signature includes the following steps:
 (a) capturing a second electronic signature as a stored sequence of data corresponding to coordinates of stylus movement producing second handwritten signature;
 (b) simultaneously displaying in locational proximity graphic counterparts of the first and second electronic signatures;
 (c) displaying, for each of the graphic counterparts, a cursor being positioned along a line segment of the signature and oriented perpendicular to the line segment; and
 (d) for each of the graphic counterparts, moving the cursor relative to the signature in response to operator input.

The method can include for each of the graphic counterparts the further steps of:
 (a) determining at least one measurement parameter relative to the line segment at which the cursor is located; and
 (b) displaying a digital representation of the parameter.

The at least one measurement parameter can be selected from the group consisting of a point number, a stroke number, an acceleration value, and a pressure value.

DRAWINGS

These and other features, aspects, and advantages of the present invention will become better understood with reference to the following description, appended claims, and accompanying drawings, where:

DESCRIPTION

Figure 1:
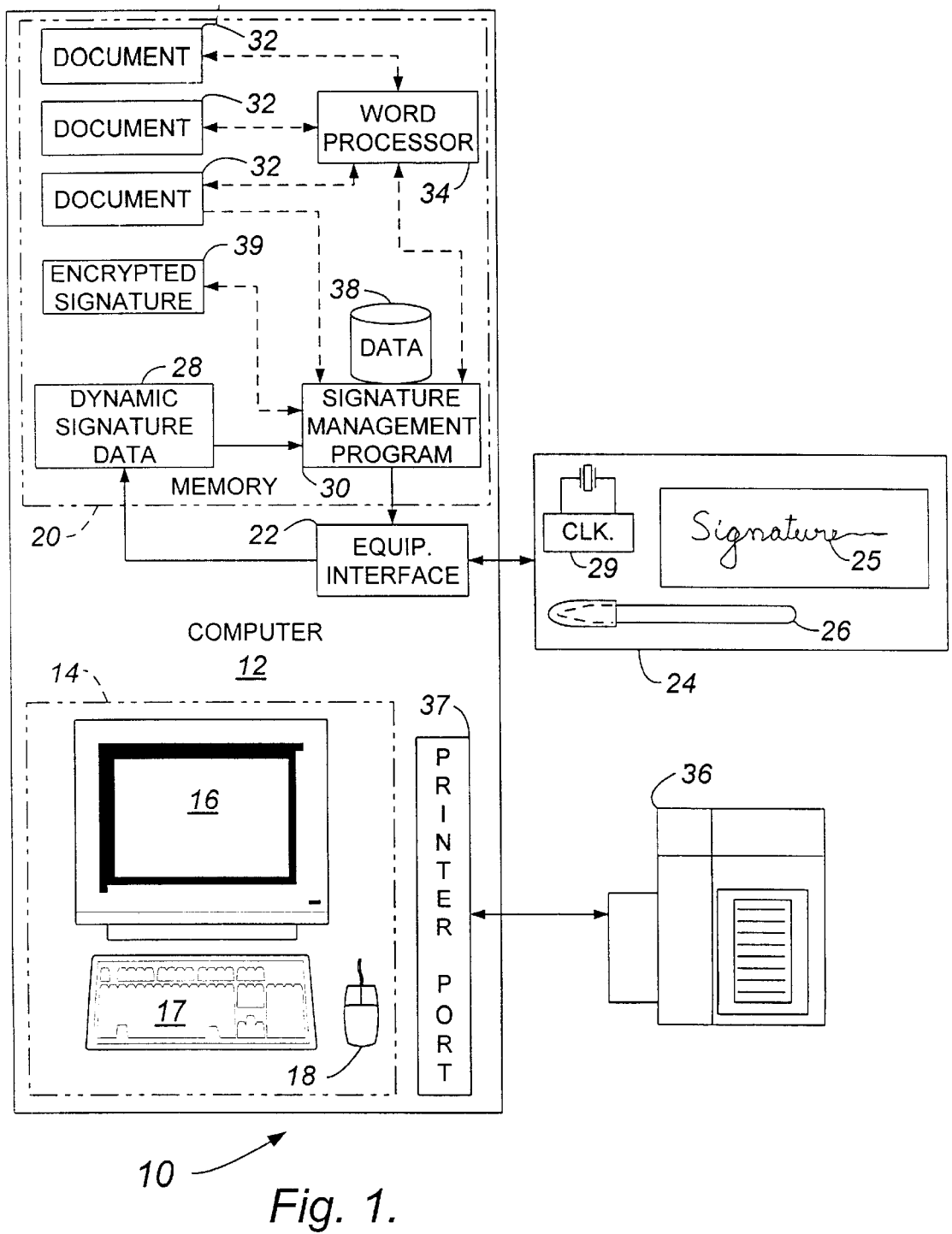
FIG. 1 is a pictorial block diagram of an electronic signature management system according to the present invention.

The present invention is directed to a computer-based signature management system that is particularly effective, reliable, and resistant to forgery, and that permits verification of electronic signatures by traditional methods. With reference to FIGS. 1–4 of the drawings, a signature management system 10 includes a computer 12 having an operator interface 14 including a screen display 16, a keyboard 17, and a pointing device or mouse 18. The computer 12 also includes a memory 20 and a device interface 22 that is suitably connected to a pen tablet 24 for capturing a handwritten signature 25 using a stylus 26. The memory 20 typically includes volatile random access memory (RAM) and non-volatile memory such as read-only memory (ROM) and random access disk memory. As used herein, storage in non-volatile memory can include temporary storage in volatile memory. According to the present invention, the pen tablet 24 is implemented for periodically transmitting pen position coordinates such as x-, y-, and z-axis data to the computer 12, the coordinate data representing precise intervals in the progression of the signature from its inception to completion and being stored by the computer 12 as a dynamic signature capture file 28 in the memory 20. An exemplary and preferred implementation of the pen tablet 24 includes a clock circuit 29 for initiating measurements of the coordinates at predetermined fixed intervals. It will be understood that the coordinate data can be transmitted immediately as measurements are completed; alternatively, data can be accumulated and transmitted in one or more batches, either spontaneously or upon interrogation by the computer 12. Verification of the time intervals can be by the clock circuit 29 can be a certified device having an unalterable time interval, the pen tablet 24 being implemented to transmit an encoded certification stamp with the coordinate data, such as by a pseudo-random data stream being imbedded within serial data being received from the tablet 24 during capture of the handwritten signature. The computer 12 is correspondingly programmed for decoding the certification stamp, successful decoding thus verifying use of the certified clock circuit 29. Alternatively, the computer can be programmed for determining a ratio of a total elapsed time of the measurements and a total number of the measurements, and comparing the ratio with the predetermined interval.

Also, a counterpart of the clock circuit 29 can be implemented in association with the device interface 22, or other suitable means for obtaining precise sampling intervals. By capturing the signature 25 at regular intervals, biometric data including the sequence of pen strokes and the precise timing of all of the elements of the signature are preserved.

The z-axis data can be simply a single-bit binary representation of a pen-up or pen-down condition or, if desired, a multiple-bit representation of pen pressure for preserving further biometric data of the signature 25. The x- and y-axis data can be in absolute, relative, or incremental form, absolute being with respect to an origin reference of the tablet 24, relative being with respect to a starting point of a signature, and incremental being with respect to the coordinate position of each preceding incremental time period. Similarly, the pen pressure data, if used, can also be in absolute, relative, or incremental form, relative being with respect to either a threshold pressure or an initial pen pressure.

In further accordance with the present invention, the computer 12 has a signature management program 30 in the memory 20 as described below in connection with FIG. 2. The computer 12 is also implemented for electronic storage and retrieval of document files 32 in any suitable manner, such as by having an installed word processor 34, which can be a conventional commercially available program. It will be understood that the signature management program 30 can be operated as a macro of the word processor 34; the word processor program 30 can be invoked under the control of the signature management program 30; and/or the word processor 34 can be combined with the signature management program 30 as a unified program, as desired, using conventional programming devices. Also, as used herein, the document files 32 are electronically stored counterparts of actual documents being printable by a printer 36 being connected to a printer port 37 of the computer 12 and driven as controlled by the word processor 34. Typically, the document files 32 contain digital codes of characters to be printed by the printer 37. Alternatively, the document files 32 can contain data codes defining a graphical representation of actual documents, as either pixels, vectors, or any combination of pixels, vectors, and characters. Thus, the document files 32 are sometimes referred to herein as documents 32. The substantive content of the document files 32 can define an entire electronic document, a collection of document data indexed in a database, a few characters and data representing a sales transaction, and many other possible forms to be authenticated or approved by signatures as described herein.

Capture, Binding and Storage

Figure 2:
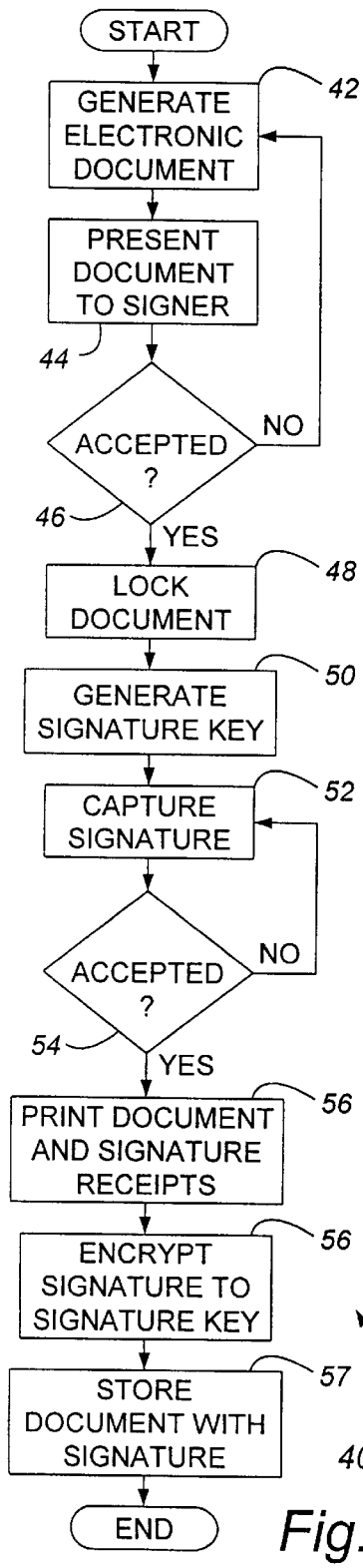
FIG. 2 is a flow chart of a computer process for document signature capture, binding and storage using the system of FIG. 1.

With particular reference to FIG. 2, the signature management program 30 controls a document signing process 40 as described herein. First a selected document 32 is generated in a preparation step 42 and presented to the signer for review in a presentation step 44. Typically, the generation and presentation steps 42 and 44 are implemented at least in part by using the operator interface 14 and the word processor 34. Next, a test document step 46 is entered for determining acceptance or rejection of the document 32. Once the document is accepted by the signer, the document file 32 is frozen or otherwise protected from further alteration except as described herein in a lock step 48. The lock step 48 can be implemented by maintaining the document file 32 in an open condition in subsequent steps of the process 40.

The document file 32 is next processed by a hashing function in a generate signature key step 50 to create a unique encryption "key" to be used to encrypt the handwritten signature 25. The signature 25 is then captured in a capture signature step 52, preferably in such a way as to preserve its biometric properties as described above. These properties include the starting and ending point of each written stroke along with the exact sequence of the signature stroke and the velocity of each segment in the stroke, and optionally the pressure applied to the pen tip at each point along the stroke. The velocity data is derived by sampling the position of the pen by means of the pen tablet 24 which samples the pen position at a preset and highly accurate timing interval. This data is formatted into the dynamic signature file which preserves the data precisely and preferably adds into the data the time and date that the signature was captured and a text or annotation string that can relate circumstances of the signing. Since the signature data is to be encrypted and tamper-proof, the time and date annotations can be reviewed at a later date as additional evidence to indicate the validity of the signature by confirming the location of the signer at the captured time and date.

Next, a signature test step 53 is entered for determining acceptance or rejection of the signature 25. For example, the signer can view a graphical display of the signature on the screen display 16, signaling by the keyboard 17 and/or the mouse 18 acceptance or rejection thereof, and the capture file 28 can be compared with previously obtained signatures of the signer that may have been stored in a database 38 that is associated with the signature management program 30 for sufficient correlation. Once the signature is accepted, receipts of the document and the signature are printed for delivery to the signer in a print receipt step 54. Thus when the signature is captured, unique document and signature receipts typically consisting of between 8 and 40 characters are generated and can be provided to the signer as a unique representation of both the document and the signature. The receipts can be printed separately or together on a single page. Also, the capture file 28 is encrypted in a signature encryption step 56 for producing an encrypted signature 39, using the signature key previously obtained in the generate signature key step 52. An important feature of the encryption step 56 is that the signature key is not retained following use thereof to create the encrypted signature 39. Accordingly, all counterparts of the signature key are preferably overwritten to positively preclude unauthorized uses thereof.

FIG. 1 shows the encrypted signature 39 being saved in the (non-volatile) memory 20 of the computer 12, it being understood that temporary maintenance in volatile RAM is also within the scope of the present invention. Since the key for encryption is derived directly and uniquely from the document, a powerful link exists between the two. If the document is tampered with or changed in any way, a key derived from the data will also have changed and the key will therefore be unable to properly decode the signature data. The signature data cannot be displayed or printed in the event of such tampering.

Finally, the encrypted signature is stored in association with the document in a save document with signature step 57, thereby binding the signature to the document. This is accomplished in any suitable manner, including conventional hierarchical database linkage, zip file creation, or encapsulation within a digital signature.

Accordingly, the present invention provides a secure combination of document and bound signature of the document. The signature data has stored within it several biometric properties that can be examined at a later date for authenticity by a forensic document examiner. Preferably all of the biometric properties available from the pen tablet 24 are retained, such as by retaining each set of the x-, y-, and z-coordinates from the tablet 24 in the encrypted signature file.

Retrieval

Figure 3:
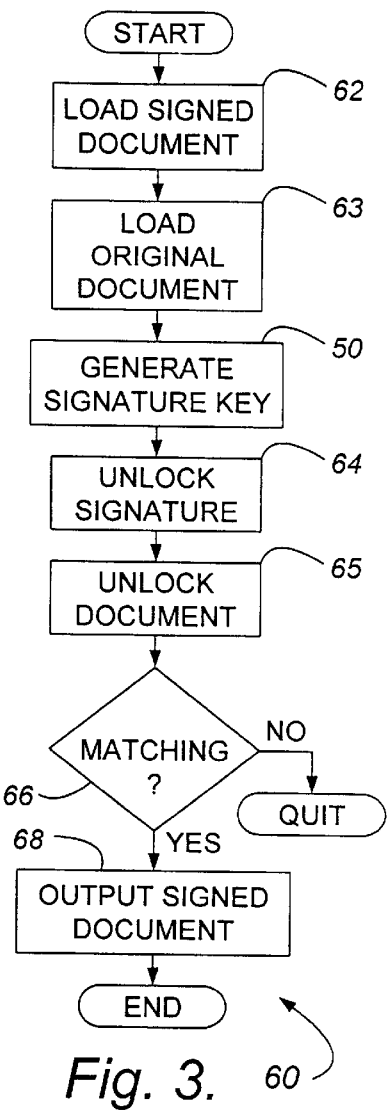
FIG. 3 is a flow chart of a computer process for retrieving a document having an electronic signature using the system of FIG. 1.

FIG. 3 shows a procedure 60 for retrieving the signed document, which requires the presence of both the original document and the original signature. The procedure 60 includes a load signed document step 62 and a load original document step 63, followed by a counterpart of the generate signature key step 50 for again obtaining the signature key. Next, an unlock signature step 64 extracts the electronic signature from the signed document file that was previously loaded, and an unlock document step 65 extracts the document from the same signed document file. Finally, a test document step 66 performs a comparison of the text of the document as extracted from the signed document file with the document as previously saved. The signature and/or the verified document is then delivered in any desired form in an output step 68. The authenticity of the retrieved signature is confirmed by identity of the document as extracted from the signed document file with the document as originally stored; otherwise, the process is aborted for lack of correspondence between the signed document and the original document. This process of the present invention is intrinsically reliable in that if the original document is absent, then a correct key cannot be derived in order to properly de-crypt the signature. Also, if the original signature is missing, the key derived from the correct document cannot be used to unlock a signature that was not originally encrypted from it. With the presence of both the original document and signature, both can be displayed and printed as the original.

Authentication

Figure 4:
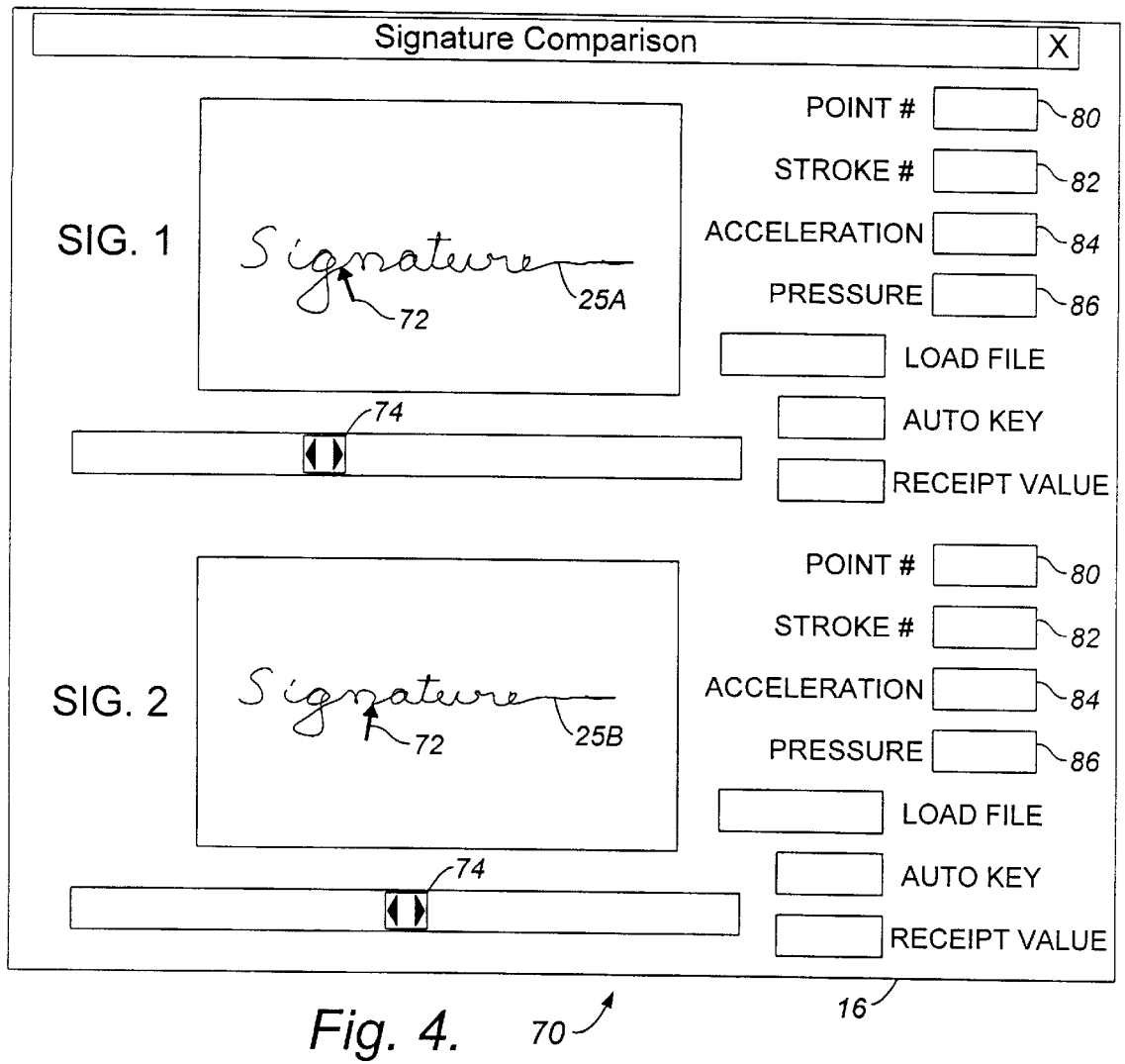
FIG. 4 is a signature authentication comparison screen diagram of the system of FIG. 1.

Authentication after the fact by a forensic document examiner is a powerful feature of the present invention that permits the same infrastructure, experts and legal weight to be applied to electronic contracts and signatures that are currently applied to paper documents, contracts and signatures. With reference to FIG. 4, an authentication screen 70 that is produced by the signature management program 30 on the screen display 16 permits at least two signatures to be compared on a computer screen side-by-side or over and under, over and under being shown in FIG. 4, respectively as first and second signature displays 25A and 25B. If pressure data is recorded in the biometric capture file 28, then the displayed line width can be modulated corresponding to variations in the pressure, greater pressure being represented by increased line width. Alternatively, the line width represents pen velocity. Also, both pressure and velocity can be indicated by the pen velocity data can being displayed as color variations, lower velocity being indicated by redness, higher velocity being conversely indicated as blueness. Further, the pressure and velocity indications can be interchanged, with lower pressure represented by increased line width.

In addition, the screen 70 includes for each of the signatures a movable pointer 72 for indicating selected elements of the respective signatures, each pointer 72 being positioned in response to a movable (graphically represented) slider 74, the sliders 74 being conventional devices commonly operated by the mouse 18 or other pointing device of the user interface 14. The end points of slider movement correspond to beginning and endpoint data of the signatures 25. The signature management program 30 locates each pointer 72 on the corresponding signature display 25A or 25B at a point corresponding to the position of the slider 74, and oriented orthogonally to the displayed line direction at that point. More particularly, the signature 25 is displayed as a series of line segments connecting successive data points, the orthogonality being with respect to a particular line segment being pointed to by the cursor 72. It will be understood that the cursor 72 can be implemented pointing to midpoints or end points of successive line segments with the same visual effect at normal magnifications. In the case of pointing to end points, orthogonality can be with respect to the line segment previously traversed or to the next segment. Thus the slider 74 is used in conjunction with the cursor 72 to select locations along the signature for particular reference. Preferably the screen 70 is further implemented for displaying metrics of the signature 25 in corresponding to the location of the cursor 72. Representative metrics to be displayed are shown in FIG. 3 as point number 80, pen stroke number 82, acceleration 84, and pressure 86. Instantaneous velocity can be included additionally or as an alternative to acceleration.

Signature Authentication Tools

A forensic document examiner can use several categories of information to compare and authenticate signatures, as presented in the following Table with corresponding supporting electronic data:

TABLE I

| Characteristic | Electronic Data Available |
| --- | --- |
| 1. Stroke Sequence: Shows, for example, whether loops are clockwise or counterclockwise. | The exact sequence of each signature is reproducible using the slider bug to precisely trace out the recorded signature sequence |
| 2. Pace of Signature: Indicates the overall pace from beginning to end and the pace around each loop. | The total elapsed time of a signature is represented by the total number of points. The velocity within loops is indicated by the modulated display line width and displayed numerically for the pointer position. |
| 3. Signature Receipt: Indicates lack of tampering. | The signature receipt value is displayed and can be compared to the hardcopy receipt value in the possession of the signer from the time of original signature. |

Document and Signature Receipts

The document and signature receipts produced in the document signing process 40 of FIG. 2 are particularly effective anti-tampering counterparts of conventional pen-on-paper signature, in that the signer or signers are allowed to keep their own original copies of the document and signature. If a clever and experienced forger is able to tamper with one copy, there is always a second copy in a second location to use for comparison and fraud detection. The electronic document and signature receipts provide this same protection requiring only the recording of simple 8 or higher digit receipts reflecting the exact content of a document or signature. If the contract is ever disputed, the signer can bring his print out of the document and signature receipts to a legal proceeding and require that the electronic document and signature receipts be compared to those which are inherent in the original electronic documents. The holder of the electronic documents can then further protect its position by providing signature and document receipts to the signer printed on special bond paper and/or with a signature from their representative affixed thereto.

Digital signatures can be used to increase the securing and effectiveness of electronic biometric signatures, documents, and receipts. For example, the signature and document receipts can be e-mailed or otherwise provided to the signer of a document via encapsulation in a digital signature. In this way, if the signature or document is disputed, the signer can demonstrate that the receipt he has in his possession is indeed an original receipt and that it has not been tampered with or altered. It is also useful to encapsulate both the original document and the linked biometric signature file into a digitally transmitted message encrypted to a digital signature. The benefit of the digital signature is that it validates the agent or workstation who transmitted the data, where the electronic, biometric signature is validating the agreement to a contract and the biometrically traceable identity of an individual person.

Figure 5:
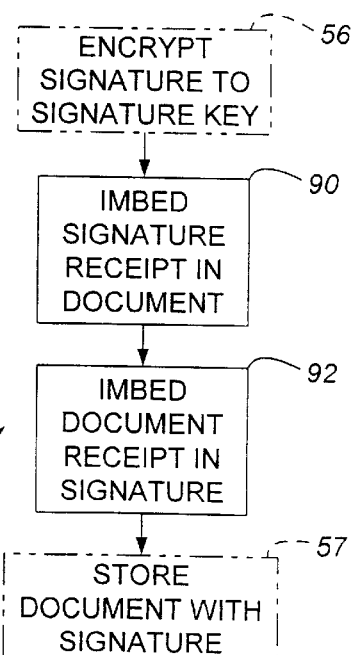
FIG. 5 is a flow chart showing an alternative configuration of the process of FIG. 2.

With further reference to FIG. 5, an alternative configuration of the document signing method, designated 40', includes, following the signature encryption step 56, cross-linking the document and signature receipts with the signature and document, respectively. More particularly, the signature receipt is combined with the document 32 in an embed signature receipt in document step 90, and the document receipt is combined with the encrypted signature 39 in an embed document receipt in signature step 92, prior to the save document with signature step 57, thereby forming a cross-linked binding of the signature with the document.

The present invention thus provides a system and method for the capture, transmission, storage and retrieval, and authentication of signatures or electronic contracts and documents. The system retains many recognized advantages of traditional paper and pen-based authentication systems that have been successful for hundreds of hears, while providing significant new benefits. For example:

1. The signature is by hand and incorporates by biometric data the identify of a human being;
2. The signature and document/data are bound together as a single entity;
3. A receipt is provided to the signer(s) with a unique link referencing the document and the signature;
4. The signature can be verified after the fact by a forensic document examiner using software comparison tools, time and date information, and comparison of receipts of the electronic document to the receipts stored independently by the signers;
5. Security is enhanced by transmission of documents, signatures, and receipts using digital signature encryption in a manner corresponding to mailing a sealed copy to oneself through the Post Office and keeping the envelope sealed.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A system for managing handwritten signatures, comprising:

(a) a graphic tablet for signaling position coordinates of a stylus during manual movement thereof relative to a writing surface;

(b) a clock circuit for periodically initiating position measurements by the graphic tablet at predetermined fixed time intervals;

(c) a first computer processor electrically interfaced with the tablet, the processor being programmed for receiving a multiplicity of the coordinates during the manual movement of the stylus, and storing respective sets of the coordinates in sequential order as an electronic signature while preserving a time relation between coordinates, the electronic signature forming a time history of the stylus movement; and (d) means for comparing the electronic signature with a reference signature, comprising the computer processor having a graphic display implemented for simultaneously displaying the electronic signature and the reference signature with corresponding cursors being positioned along a line segment of the signature and oriented perpendicular to the line segment, and the computer being further implemented for moving the cursors in response to operator input.

2. The system of claim 1, wherein the means for comparing further comprises reference memory for storing an electronic counterpart of the reference signature, and a cross-correlator for evaluating a degree of correspondence between respective time histories of the electronic signature and the electronic counterpart of the reference signature.

3. The system of claim 2, wherein the reference memory is electronically interfaced with the first computer processor.

4. The system of claim 1, wherein the electronic signature has associated therewith a date and time of the handwritten signature.

5. The system of claim 4, wherein the electronic signature has further associated therewith an annotation including at least one of a geographic location, a physical address, and an identification string.

6. The system of claim 1, wherein the first computer processor is a digital processor, and the electronic signature is a digital signature.

7. The system of claim 1, wherein the computer is further programmed for encrypting the time history to a fixed key of arbitrary length, the stored electronic signature being in encrypted form.

8. The system of claim 7, wherein the computer is programmed for generating the key as a cryptographic hash function or message digest of the document.

9. The system of claim 1, wherein the computer processor is further implemented for determining a stylus velocity associated with each line segment, and displaying the line segments at widths being proportional to the stylus velocity.

10. The system of claim 1, wherein the computer processor is programmed for displaying the line segments at widths being proportional to the stylus pressure data.

11. A system for managing handwritten signatures, comprising:
    (a) a graphic tablet for signaling position coordinates of a stylus during manual movement thereof relative to a writing surface;
    (b) a clock circuit in the graphic tablet for periodically initiating position measurements by the graphic tablet at predetermined fixed time intervals;
    (c) a first computer processor electrically interfaced with the tablet, the processor being programmed for receiving a multiplicity of the coordinates during the manual movement of the stylus, and storing respective sets of the coordinates in sequential order as an electronic signature while preserving a time relation between coordinates, the electronic signature forming a time history of the stylus movement; and
    (d) means for verifying the fixed time intervals of the measurements, comprising the computer being programmed for determining a ratio of a total elapsed time of the measurements and a total number of the measurements, and comparing the ratio with the predetermined interval.

12. The system of claim 11, wherein the time intervals are not greater than 20 milliseconds.

13. The system of claim 12, wherein the time intervals are between 2 milliseconds and 3 milliseconds.

14. The system of claim 11, wherein the means for verifying the time intervals comprises:
    (a) the clock circuit having a certified unalterable time interval;
    (b) the tablet being implemented for transmitting an encoded certification stamp with the coordinate data; and
    (c) the computer being programmed for decoding the certification stamp to verify use of the certified time interval.

15. The system of claim 11, wherein the first computer processor is a digital processor, and the electronic signature is a digital signature.

16. The system of claim 11, wherein the computer is further programmed for encrypting the time history to a fixed key of arbitrary length, the stored electronic signature being in encrypted form.

17. The system of claim 16, wherein the computer is programmed for generating the key as a cryptographic hash function or message digest of the document.

18. A method for verifying the signature of an electronically signed a document having associated therewith an electronic signature being a stored sequence of data corresponding to coordinates of stylus movement producing a first handwritten signature:
    (a) capturing a second electronic signature as a stored sequence of data corresponding to coordinates of stylus movement producing second handwritten signature;
    (b) simultaneously displaying in locational proximity graphic counterparts of the first and second electronic signatures;
    (c) displaying, for each of the graphic counterparts, a cursor being positioned along a line segment of the signature and oriented perpendicular to the line segment; and
    (d) for each of the graphic counterparts, moving the cursor relative to the signature in response to operator input.

19. The method of claim 18, comprising, for each of the graphic counterparts the further steps of:
    (a) determining at least one measurement parameter relative to the line segment at which the cursor is located; and
    (b) displaying a digital representation of the parameter.

20. The method of claim 19, wherein the at least one measurement parameter is selected from the group consisting of a point number, a stroke number, an acceleration value, and a pressure value.

21. A system for managing handwritten signatures, comprising:
    (a) a graphic tablet for signaling position coordinates of a stylus during manual movement thereof relative to a writing surface;
    (b) a computer processor electrically interfaced with the tablet, the processor being programmed for receiving a multiplicity of the coordinates during the manual movement of the stylus, and storing respective sets of the coordinates in sequential order as an electronic signature while preserving a time relation between coordinates, the electronic signature forming a time history of the stylus movement; and
    (c) means for comparing the electronic signature with a reference signature, comprising the computer processor having a graphic display implemented for simultaneously displaying the electronic signature and the reference signature with corresponding cursors being positioned along a line segment of the signature and oriented perpendicular to the line segment, and the computer being further implemented for moving the cursors in response to operator input.

22. The system of claim 21, wherein the electronic signature includes recorded stylus pressure data, the system further comprising means for varying a displayed line width of each line segment of the electronic signature and the reference signature, the computer processor being further implemented for displaying the line segments of the electronic signature at widths being proportional to the stylus pressure data.

23. The system of claim 21, the system further comprising means for varying a displayed line width of each line segment of the electronic signature and the reference signature, the computer processor being further implemented for determining a stylus velocity associated with each line segment of the electronic signature, and displaying the line segments of the electronic signature at widths being proportional to the stylus velocity.

24. A system for managing handwritten signatures, comprising:

(a) a graphic tablet for signaling position coordinates of a stylus during manual movement thereof relative to a writing surface;

(b) a computer processor electrically interfaced with the tablet, the processor being programmed for receiving a multiplicity of the coordinates during the manual movement of the stylus, and storing respective sets of the coordinates in sequential order as an electronic signature while preserving a time relation between coordinates, the electronic signature forming a time history of the stylus movement, the computer processor having a graphic display implemented for displaying the electronic signature as sequential line segments; and (c) the computer processor being further implemented for determining a stylus velocity associated with each line segment, and displaying the line segments at widths being proportional to the stylus velocity.

25. A system for managing handwritten signatures, comprising:

(a) a graphic tablet for signaling position coordinates and stylus pressure data of a stylus during manual movement thereof relative to a writing surface;

(b) a computer processor electrically interfaced with the tablet, the processor being programmed for receiving a multiplicity of the coordinates and the stylus pressure data during the manual movement of the stylus, and storing respective sets of the coordinates with the stylus pressure data in sequential order as an electronic signature, the electronic signature forming a time history of the stylus movement and pressure, the computer processor having a graphic display implemented for displaying the electronic signature as sequential line segments; and (c) the computer processor being further implemented for displaying the line segments at widths being proportional to the stylus pressure data.

26. A method for authenticating a document having been signed by a method comprising capturing a handwritten signature as a sequence of data corresponding to coordinates of stylus movement producing the signature, storing the data as an electronic signature, creating a signature receipt as a cryptographic hash function or message digest of the electronic signature, creating a signature encryption key by generating a cryptographic hash function or message digest of a stored counterpart of the document, encrypting the electronic signature using the signature encryption key, creating a document receipt as a cryptographic hash function or message digest of a stored counterpart of the document, producing counterparts of the signature and document receipts, and encapsulating the signature and document receipts in a digital signature, the method comprising the further steps of:

(a) transmitting the digital signature containing the signature and document receipts to a signer of the document;

(b) recalling the transmitted digital signature (c) extracting the signature and document receipts from the digital signature;

(d) recovering the electronic signature and a stored counterpart of the document;

(e) generating new signature and document receipts from the recovered electronic signature and the stored counterpart of the document; and (f) comparing the recovered signature and document receipts with the new signature and document receipts, the document being authenticated when respective receipt counterparts are matching.

27. The method system of claim 26, comprising the further steps of identifying stored instances of the signature encryption key and erasing each such instance.

28. A method for authenticating a document having been signed by a method comprising capturing a handwritten signature as a sequence of data corresponding to coordinates of stylus movement producing the signature, storing the data as an electronic signature, creating a signature receipt as a cryptographic hash function or message digest of the electronic signature, creating a signature encryption key by generating a cryptographic hash function or message digest of a stored counterpart of the document, encrypting the electronic signature using the signature encryption key, creating a document receipt as a cryptographic hash function or message digest of a stored counterpart of the document, and producing counterparts of the signature and document receipts, the method comprising the further steps of:

(a) distributing plural counterparts of the signature and document receipts to signers of the document;

(b) recalling the distributed signature and document receipts; and (c) comparing the recalled signature receipts and the document receipts, the document being authenticated when respective receipt counterparts are matching.

29. The method of claim 28, comprising the further step of encapsulating the signature and document receipts in a digital signature.

30. The method system of claim 28, comprising the further steps of identifying stored instances of the signature encryption key and erasing each such instance.

31. A method for authenticating a document having been signed by a method comprising capturing a handwritten signature as a sequence of data corresponding to coordinates of stylus movement producing the signature, storing the data as an electronic signature, creating a signature receipt as a cryptographic hash function or message digest of the electronic signature, creating a signature encryption key by generating a cryptographic hash function or message digest of a stored counterpart of the document, encrypting the electronic signature using the signature encryption key, creating a document receipt as a cryptographic hash function or message digest of a stored counterpart of the document, and producing counterparts of the signature and document receipts, the method comprising the further steps of:

(a) delivering the signature and document receipts to a signer of the document;
(b) recalling the signature and document receipts;
(c) recovering the electronic signature and a stored counterpart of the document;
(d) generating new signature and document receipts from the recovered electronic signature and the stored counterpart of the document; and
(e) comparing the recalled signature and document receipts with the new signature and document receipts, the document being authenticated when respective receipt counterparts are matching.

32. The method of claim 31, comprising the further step of encapsulating the electronic signature in a digital signature.

33. The method system of claim 31, comprising the further steps of identifying stored instances of the signature encryption key and erasing each such instance.

* * * * *

UNITED STATES PATENT AND TRADEMARK OFFICE
CERTIFICATE OF CORRECTION

| | | |
|---|---|---|
| PATENT NO. | : 6,307,955 C1 | Page 1 of 1 |
| APPLICATION NO. | : 90/008795 | |
| DATED | : May 19, 2009 | |
| INVENTOR(S) | : Zank et al. | |

It is certified that error appears in the above-identified patent and that said Letters Patent is hereby corrected as shown below:

Claim 25, column 2, line 7: change "table" to --tablet--

Claim 34, column 2, line 31: change "table" to --tablet--

Signed and Sealed this

Twenty-first Day of February, 2012

David J. Kappos
*Director of the United States Patent and Trademark Office*

(12) EX PARTE REEXAMINATION CERTIFICATE (6828th)

United States Patent
Zank et al.

(10) Number: US 6,307,955 C1
(45) Certificate Issued: May 19, 2009

(54) ELECTRONIC SIGNATURE MANAGEMENT SYSTEM

(75) Inventors: Anthony E. Zank, Simi Valley, CA (US); David R. Stevens, Simi Valley, CA (US)

(73) Assignee: Topaz Systems, Inc., Simi Valley, CA (US)

Reexamination Request:
No. 90/008,795, Sep. 11, 2007

Reexamination Certificate for:
Patent No.: 6,307,955
Issued: Oct. 23, 2001
Appl. No.: 09/216,246
Filed: Dec. 18, 1998

(51) Int. Cl.
*G06K 9/00* (2006.01)

(52) U.S. Cl. .................. 382/121; 382/122; 382/189; 382/218; 713/176; 380/30
(58) Field of Classification Search .................. None
See application file for complete search history.

(56) References Cited

U.S. PATENT DOCUMENTS

| | | | |
|---|---|---|---|
| 4,488,000 A | 12/1984 | Glenn | 178/18.04 |
| 5,155,813 A | 10/1992 | Donoghue | 345/179 |
| 5,353,396 A | 10/1994 | Ahlquist | 345/442 |
| 5,434,959 A | 7/1995 | Von Ehr | 345/441 |

OTHER PUBLICATIONS

Uniform Electronic Transaction Act (1999), National Conference of Commissioners on Uniform State Laws, printed from website http://www.lawupenn.edu/bll/archives/ulc/fnact99/1990s/ueta99.htm.*

Wacom, Pen Partner User's Manual for Windows, Copyright 1997.

Wacom Frequently Asked Questions printed from http://web.archive.org/web/19961122194510/wacom.com/techsupp.html.

* cited by examiner

*Primary Examiner*—Lynne H. Browne

(57) ABSTRACT

An electronic signature management system includes a graphic tablet digitizer for signaling position coordinates of a stylus being moved to produce a handwritten signature, a clock circuit of the digitizer defining a fixed interval between successive stylus position measurements, a computer processor electrically interfaced with the tablet and programmed for receiving and storing a multiplicity of the coordinates in sequential order as an electronic signature forming a time history of the stylus movement. The computer is also programmed for verifying the fixed time intervals of the measurements, such as by comparing a ratio of total elapsed time and total number of the measurements with a standard measurement interval, and for comparing the electronic signature with a reference signature, such as by feeding a stored reference signature counterpart and the electronic signature into a cross-correlator for evaluating a degree of correspondence between respective time histories of the electronic signature and the reference signature. The signatures can also be compared visually in a simultaneous display wherein respective pointers follow the signatures orthogonally in response to an operator-controlled slider, with pertinent data corresponding to the pointer positions being displayed. The electronic signature is preferably encrypted using a hash function or message digest of the document as a key. Also disclosed are methods for electronically signing a document, wherein the electronic signature is electronically bound to the document, wherein the electronic signature is encrypted using a key derived from the document and not saved, and methods for decrypting and verifying electronic signatures.

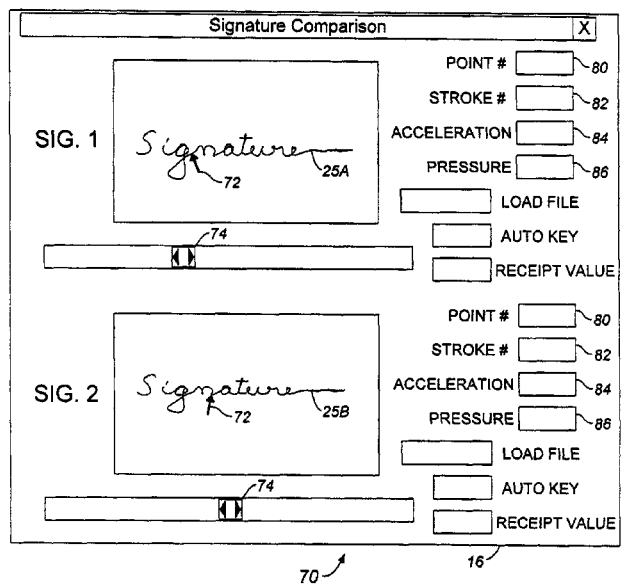

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 25 is determined to be patentable as amended.

New claims 34 and 35 are added and determined to be patentable.

Claims 1–24 and 26–33 were not reexamined.

25. A system for managing handwritten signatures, comprising:
   (a) a graphic tablet for signaling position coordinates and stylus pressure data of a stylus during manual movement thereof relative to a writing surface;
   (b) a computer processor electrically interfaced with the tablet, the processor being programmed for receiving a multiplicity of the coordinates and the stylus pressure data during the manual movement of the stylus, and storing respective sets of the coordinates with the stylus pressure data in sequential order as an electronic signature, the electronic signature forming a time history of the stylus movement and pressure, the computer processor having a graphic display implemented for displaying the electronic signature as sequential line segments; and
   (c) the computer processor being further implemented for displaying the line segments at widths being proportional to the stylus pressure data
   *wherein the time history comprises an encoded certification stamp provided by the graphic table.*

*34. A system for managing a handwritten signature, comprising:*
   *(a) a graphic tablet for signaling position coordinates and stylus pressure data of a stylus during manual movement thereof relative to a writing surface in forming the handwritten signature;*
   *(b) a computer processor electrically interfaced with the tablet, the processor being programmed for receiving a multiplicity of the coordinates and the stylus pressure data during the manual movement of the stylus, and storing respective sets of the coordinates with the stylus pressure data in sequential order as an electronic signature, the electronic signature forming a time history of the stylus movement and pressure, wherein the time history allows determination of the time interval between the stored sets of the coordinates, the computer processor having a graphic display implemented for displaying the electronic signature as sequential line segments; and*
   *(c) the computer processor being further implemented for displaying the line segments at widths being proportional to the stylus pressure data*
   *wherein the time history comprises an encoded certification stamp provided by the graphic table.*

*35. The system of claim 34 wherein the computer processor is further implemented for decoding the certification stamp to verify use of the time interval.*

* * * * *

(12) EX PARTE REEXAMINATION CERTIFICATE (10566th)
United States Patent
Zank et al.

(10) Number: US 6,307,955 C2
(45) Certificate Issued: Apr. 7, 2015

(54) ELECTRONIC SIGNATURE MANAGEMENT SYSTEM

(75) Inventors: Anthony E. Zank, Simi Valley, CA (US); David R. Stevens, Simi Valley, CA (US)

(73) Assignee: Topaz Systems, Inc., Simi Valley, CA (US)

Reexamination Request:
No. 90/012,202, Mar. 20, 2012

Reexamination Certificate for:
Patent No.: 6,307,955
Issued: Oct. 23, 2001
Appl. No.: 09/216,246
Filed: Dec. 18, 1998

Reexamination Certificate C1 6,307,955 issued May 19, 2009

Certificate of Correction issued Feb. 21, 2012

(51) Int. Cl.
*G06K 9/00* (2006.01)
(52) U.S. Cl.
CPC ................... *G06K 9/00154* (2013.01)
(58) Field of Classification Search
None
See application file for complete search history.

(56) References Cited

To view the complete listing of prior art documents cited during the proceeding for Reexamination Control Number 90/012,202, please refer to the USPTO's public Patent Application Information Retrieval (PAIR) system under the Display References tab.

*Primary Examiner* — Charles Craver

(57) ABSTRACT

An electronic signature management system includes a graphic tablet digitizer for signaling position coordinates of a stylus being moved to produce a handwritten signature, a clock circuit of the digitizer defining a fixed interval between successive stylus position measurements, a computer processor electrically interfaced with the tablet and programmed for receiving and storing a multiplicity of the coordinates in sequential order as an electronic signature forming a time history of the stylus movement. The computer is also programmed for verifying the fixed time intervals of the measurements, such as by comparing a ratio of total elapsed time and total number of the measurements with a standard measurement interval, and for comparing the electronic signature with a reference signature, such as by feeding a stored reference signature counterpart and the electronic signature into a cross-correlator for evaluating a degree of correspondence between respective time histories of the electronic signature and the reference signature. The signatures can also be compared visually in a simultaneous display wherein respective pointers follow the signatures orthogonally in response to an operator-controlled slider, with pertinent data corresponding to the pointer positions being displayed. The electronic signature is preferably encrypted using a hash function or message digest of the document as a key. Also disclosed are methods for electronically signing a document, wherein the electronic signature is electronically bound to the document, wherein the electronic signature is encrypted using a key derived from the document and not saved, and methods for decrypting and verifying electronic signatures.

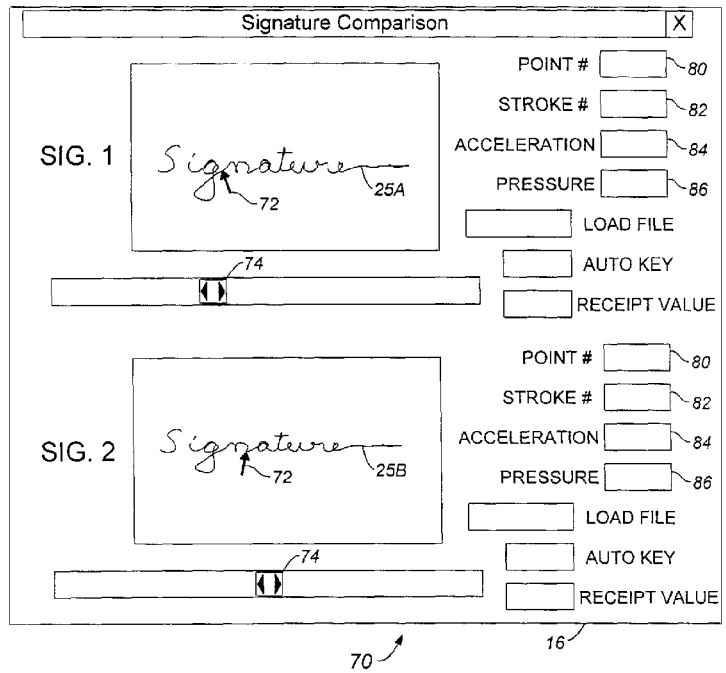

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 24 is cancelled.

New claims 36-38 are added and determined to be patentable.

Claims 1-23 and 25-35 were not reexamined.

*36. A system for managing handwritten signatures, comprising:*
  *(a) a graphic tablet for signaling position coordinates of a stylus during manual movement thereof relative to a writing surface;*
  *(b) a computer processor electrically interfaced with the tablet, the processor being programmed for receiving a multiplicity of the coordinates during the manual movement of the stylus, and storing respective sets of the coordinates in sequential order as an electronic signature while preserving a time relation between coordinates, the electronic signature forming a time history of the stylus movement, the computer processor having a graphic display implemented for displaying the electronic signature as sequential line segments; and*
  *(c) the computer processor being further implemented for determining a stylus velocity associated with each line segment, and displaying the line segments at widths being proportional to the stylus velocity,*
  *wherein the time history comprises an encoded certification stamp provided by the graphic tablet.*

*37. A system for managing a handwritten signature, comprising:*
  *(a) a graphic tablet for signaling position coordinates of a stylus during manual movement thereof relative to a writing surface;*
  *(b) a computer processor electrically interfaced with the tablet, the processor being programmed for receiving a multiplicity of the coordinates and stylus velocity data during the manual movement of the stylus, and storing respective sets of the coordinates in sequential order as an electronic signature while preserving a time relation between coordinates, the electronic signature forming a time history of the stylus movement and velocity data, wherein the time history allows determination of the time interval between the stored sets of the coordinates, the computer processor having a graphic display implemented for displaying the electronic signature as sequential line segments; and*
  *(c) the computer processor being further implemented for displaying the line segments at widths being proportional to the stylus velocity data.*

*38. A system for managing a handwritten signature, comprising:*
  *(a) a graphic tablet for signaling position coordinates of a stylus during manual movement thereof relative to a writing surface;*
  *(b) a computer processor electrically interfaced with the tablet, the processor being programmed for receiving a multiplicity of the coordinates and stylus velocity data during the manual movement of the stylus, and storing respective sets of the coordinates in sequential order as an electronic signature while preserving a time relation between coordinates, the electronic signature forming a time history of the stylus movement and velocity data, wherein the time history allows determination of the time interval between the stored sets of the coordinates, the computer processor having a graphic display implemented for displaying the electronic signature as sequential line segments; and*
  *(c) the computer processor being further implemented for displaying the line segments at widths being proportional to the stylus velocity data,*
  *wherein the time history comprises an encoded certification stamp provided by the graphic tablet.*

* * * * *